United States Patent Office 2,782,207
Patented Feb. 19, 1957

2,782,207

PRODUCTION OF COPPER-PHTHALOCYANINE PRECURSOR

Melvin A. Perkins and Myron S. Whelen, Brandywine Hundred, Del., assignors to E. I. du Pont de Nemours & Company, Wilmington, Del., a corporation of Delaware No Drawing. Application May 17, 1954,
Serial No. 430,400

6 Claims. (Cl. 260—319)

This invention relates to the production of copper-phthalocyanine precursor, which may be defined as an alcohol-soluble complex compound having a composition corresponding to the empirical formula $Cu(C_8H_4N_2)_6NH$, and which is characterized by yielding copper phthalocyanine upon being treated with reducing agents, the remaining two units of phthalonitrile and the extra NH group being split off in the process in the form of ammonia and phthalonitrile or other phthalic compounds resulting from the interaction of phthalonitrile, ammonia and the reducing medium. This novel compound was first described in copending application of Barnhart and Skiles, Serial No. 252,401 (Patent No. 2,772,284, issued November 27, 1956), wherein it was synthesized by reacting, at a temperature not exceeding 90° C., phthalonitrile, an anhydrous cupric salt and ammonia in an alcoholic solvent containing a catalyst or promoter, and recovering the reaction product by diluting the liquid portion of the reaction mass with water. The catalyst indicated in said copending application was a member of the group consisting of urea, biuret, guanidine and methyl glucamine.

It is an object of this invention to improve the economy and efficiency of the process of producing copper-phthalocyanine precursor. Various other objects and achievements of this invention will appear as the description proceeds.

In copending application of A. C. Stevenson, Serial No. 384,349 (Patent No. 2,772,283, issued November 27, 1956), it is taught that the reaction time in the mentioned process of Barnhart and Skiles may be shortened considerably by feeding into the reaction mass oxygen in gaseous form, for instance air or a mixture of air and ammonia, during the active period of the reaction. We now find that the same acceleration of the process, and other advantages, may be achieved by adding to the reaction mass, initially or during the course of the reaction, solid or liquid oxidizing agents. More particularly, we may employ for the purposes of this invention alkali-metal nitrites, nitrates, ferricyanides, nitrobenzene sulfonates and 2-anthraquinone sulfonates. We may also use calcium hypochlorite, hydrogen peroxide, mercuric oxide and aromatic nitrohydrocarbons such as nitrobenzene, and the various mono nitrotoluenes, nitroxylenes and nitronaphthalenes. In general, we may use any oxidizing agent which is inert toward the solvent employed, but the ones indicated above give superior results.

The quantity of oxiding agent employed is preferably that which will supply 0.25 to 1.25 oxygen equivalents per atom of copper in the reaction mass. But larger quantities are tolerable, the upper limit being determined chiefly by considerations of economy and safety.

Apart from the above details, the reaction may be carried essentially along the lines indicated in said copending application of Stevenson. Thus, the source of copper may be an anhydrous or hydrated copper salt, for instance: cupric chloride or its dihydrate; cupric bromide; cupric sulfate and its monohydrate or pentahydrate; cupric nitrate trihydrate; cupric acetate and its monohydrate.

The temperature of the reaction mass is preferably maintained within the limits of 70° C. to 95° C. Within this range, an optimum narrower range may be determined readily by experiment for each particular combination of oxidizing agent and copper salt selected.

Dimethyl formamide is the preferred solvent, but it may be diluted with large quantities of ethyl, isopropyl or tertiary butyl alcohol, provided the total quantity of the principal solvent is sufficient to dissolve the reactants in the absence of the auxiliary alcohol.

As promoter for the reaction, may be employed guanidine, methylglucamine, iminophthalimidine, or 1,3-diiminoisoindoline. Its quantity may vary from 0.05 to 0.5 mole per mole of phthalonitrile.

The order of bringing the reactants together may be varied considerably. For instance—

(1) All reactants may be added at the beginning at room temperature and the mass then brought to reaction temperature.

(2) The oxidizing agent may be added in portions, some at the beginning at room temperature, and the remainder during the course of the reaction at varying temperatures as the reaction mass is heated up, or altogether at the reaction temperature.

(3) All reactants except ammonia may be added together at room temperature after which the reaction mass is heated to the reaction temperature and ammonia gas can be led in.

The advantages of our invention are that the quantity of oxidizing agent is easier to control than in the case of air, with the results that purer precursor products are obtained. The rate of reaction is more readily controllable, it being noted here that the synthesis of copper-phthalocyanine precursor according to the general method of Barnhart and Skiles is an exothermic reaction. Where air and ammonia mixtures are employed or where such mixtures are formed in the reaction, danger exists that the effluent gases will constitute an explosive mixture. This hazard is eliminated by our invention.

Without limiting our invention, the following examples are given to illustrate our preferred mode of operation. Parts, where mentioned, are by weight.

Example 1

To 188 parts of dimethyl formamide, 22.5 parts of cupric chloride (anhydrous) are added, and ammonia gas is bubbled into the suspension until the mass is saturated. 128 parts of phthalonitrile and 10 parts of methylglucamine are added and the reaction mass is heated to 81° C. 10 parts of 30% aqueous hydrogen peroxide, dissolved in 25 parts of dimethyl formamide are then added dropwise at 81–84° C. over two hours. The reaction mass is clarified by filtration, and the filtrate is poured into water. The precipitated copper-phthalocyanine precursor is filtered off, washed with water until free of dimethyl formamide, and dried.

Example 2

To 1400 parts of dimethyl formamide, 150 parts of copper sulfate monohydrate ($CuSO_4.H_2O$) are added, and the whole mass is saturated with anhydrous ammonia below 40° C. 640 parts of phthalonitrile, 50 parts of methylglucamine and 5 parts of sodium nitrite are added, and the reaction mass is heated to 82° C. After 30 minutes heating at 82–84° C., 5 parts of sodium nitrite are added; after 60 minutes of heating, 5 parts more of sodium nitrite are added, followed by a further addition of 5 parts of sodium nitrite at the end of 90 minutes of heating. The reaction mass is heated at 82° C. for a further 30 minutes, after which it is clarified by filtration and isolated by the method of Example 1.

Instead of adding the sodium nitrite over an extended period as indicated above, the same may be added in its entirety at the beginning of the procedure, at room temperature. The reaction mass is then heated at 74–76° C. for two hours, and the product is isolated as above. Copper-phthalocyanine precursor is thus obtained, in high yield and quality.

*Example 3*

To 140 parts of dimethyl formamide, 15 parts of copper sulfate monohydrate, 64 parts of phthalonitrile, 5 parts of methylglucamine and 2.7 parts of sodium nitrite are added. The mass is heated to 75° C. and a gentle stream of ammonia is bubbled in. The reaction is exothermic and the speed of the reaction is controlled by the rate of addition of ammonia. The mass is heated at 75–80° C. for two hours, after which the reaction mass is clarified and the product isolated as in Example 1.

*Example 4*

To 140 parts of dimethyl formamide, 15 parts of $CuSO_4.H_2O$, 64 parts of phthalonitrile, 5 parts of methylglucamine and 4 parts of m-nitrobenzene sodium-sulfonate, ammonia is added until the mass is saturated. The reaction mass is heated at 84–86° C. for two hours and the precursor formed is isolated as in Example 1.

Instead of m-nitrobenzene sodium-sulfonate, nitrobenzene itself may be used, or various other oxidizing agents, for instance, sodium nitrate, ammonium nitrate, mercuric oxide, calcium hypochlorite, potassium ferricyanide or anthraquinone-2-sodium-sulfonate.

*Example 5*

To 135 parts of dimethyl formamide 14.5 parts of copper sulfate monohydrate are added, and the suspension is saturated with ammonia gas below 40° C. 64 parts of phthalonitrile, 5 parts of methylglucamine, and 6 parts of calcium hypochlorite (33% available chlorine) are added. The mixture is heated to 92° C. and maintained at this temperature for one hour. The reaction mass is then filtered to remove insoluble materials, and the filtrate is drowned in 1000 parts of water. The precipitated phthalocyanine precursor is filtered off, washed with water until free of dimethyl formamide, and dried.

*Example 6*

To 135 parts of dimethyl formamide 14.5 parts of copper sulfate monohydrate are added, and the suspension is saturated with ammonia gas below 40° C. 64 parts of phthalonitrile, 5 parts of methylglucamine and 2.5 parts ammonium nitrate are added. The reaction mass is heated to 95° C., at which temperature the reaction is vigorous, and thereafter maintained at 90–92° C. for one hour, utilizing cooling and heating when necessary. The reaction mass is then filtered to remove insoluble material and the filtrate is poured into 1000 parts of water, after which the precipitated copper phthalocyanine precursor is filtered off and washed with water to remove dimethyl formamide, followed by drying.

*Example 7*

To 135 parts of dimethyl formamide 14.5 parts copper sulfate monohydrate are added, and the suspension is saturated with ammonia gas below 40° C. 64 parts of phthalonitrile, 5 parts of methylglucamine, and 2.5 parts of sodium nitrate are added and the reaction mass is gradually heated to 80° C. A temperature of 85–90° C. is then maintained for one hour. The reaction mass is filtered to remove insoluble materials and the filtrate is drowned in 1000 parts of water, after which the precipitated copper phthalocyanine precursor is filtered off and washed with water to remove dimethyl formamide, followed by drying.

It will be understood that the temperature ranges and oxidizing agents indicated in the above examples are interchangeable, and that in any of the examples, the quantity of oxidizing agent, temperature and period of heating may be varied to compensate for one another, for instance by heating at 85–95° C. for one hour or at 75–85° C. for two hours, etc.

Numerous other variations in details of procedure will be readily apparent to those skilled in the art.

We claim:

1. In the process of producing copper phthalocyanine precursor by heating together, at a temperature not exceeding 95° C., phthalonitrile, a copper salt and ammonia in an organic solvent, the improvement which consists of effecting the reaction in the presence of a non-gaseous oxidizing agent which is inert toward the solvent.

2. In the process of producing copper phthalocyanine precursor by heating together, at a temperature not exceeding 95° C., phthalonitrile, a copper salt and ammonia in an organic solvent, the improvement which consists of effecting the reaction in the presence of an oxidizing agent selected from the group consisting of hydrogen peroxide, mercuric oxide, aromatic nitrohydrocarbons, calcium hypochlorite, and alkali-metal nitrites, nitrates, ferricyanides, nitrobenzene-sulfonates and 2-anthraquinone-sulfonates.

3. A process for producing copper-phthalocyanine precursor, which comprises heating together in dimethyl formamide, at a temperature between 70° C. and 95° C. and in the presence of methylglucamine, a copper salt, phthalonitrile, ammonia and an alkali-metal nitrite, the quantity of phthalonitrile being about 6 moles and that of alkali-metal nitrite at least 0.25 oxygen equivalents, per mole of copper salt.

4. A process for producing copper-phthalocyanine precursor, which comprises heating together in dimethyl formamide, at a temperature between 70° C. and 95° C. and in the presence of methylglucamine, a copper salt, phthalonitrile, ammonia and an alkali-metal nitrate, the quantity of phthalonitrile being about 6 moles and that of alkali-metal nitrate at least 0.25 oxygen equivalents, per mole of copper salt.

5. A process for producing copper-phthalocyanine precursor, which comprises heating together in dimethyl formamide, at a temperature between 70° C. and 95° C. and in the presence of methylglucamine, a copper salt, phthalonitrile, ammonia and calcium hypochlorite, the quantity of phthalonitrile being about 6 moles and that of calcium hypochlorite at least 0.25 oxygen equivalents, per mole of copper salt.

6. A process for producing copper-phthalocyanine precursor, which comprises heating together in dimethyl formamide, at a temperature between 70° C. and 95° C. and in the presence of methylglucamine, a copper salt, phthalonitrile, ammonia and an aromatic nitrohydrocarbon, the quantity of phthalonitrile being about 6 moles and that of the nitrohydrocarbon at least 0.25 oxygen equivalents, per mole of copper salt.

References Cited in the file of this patent

UNITED STATES PATENTS

| | | |
|---|---|---|
| 2,302,612 | Lacey | Nov. 17, 1942 |
| 2,662,897 | Pedersen | Dec. 15, 1953 |

FOREIGN PATENTS

| | | |
|---|---|---|
| 197,288 | Switzerland | Aug. 1, 1938 |
| 497,511 | Belgium | Dec. 1, 1950 |
| 698,049 | Great Britain | Oct. 7, 1953 |